No. 764,382. Patented July 5, 1904.

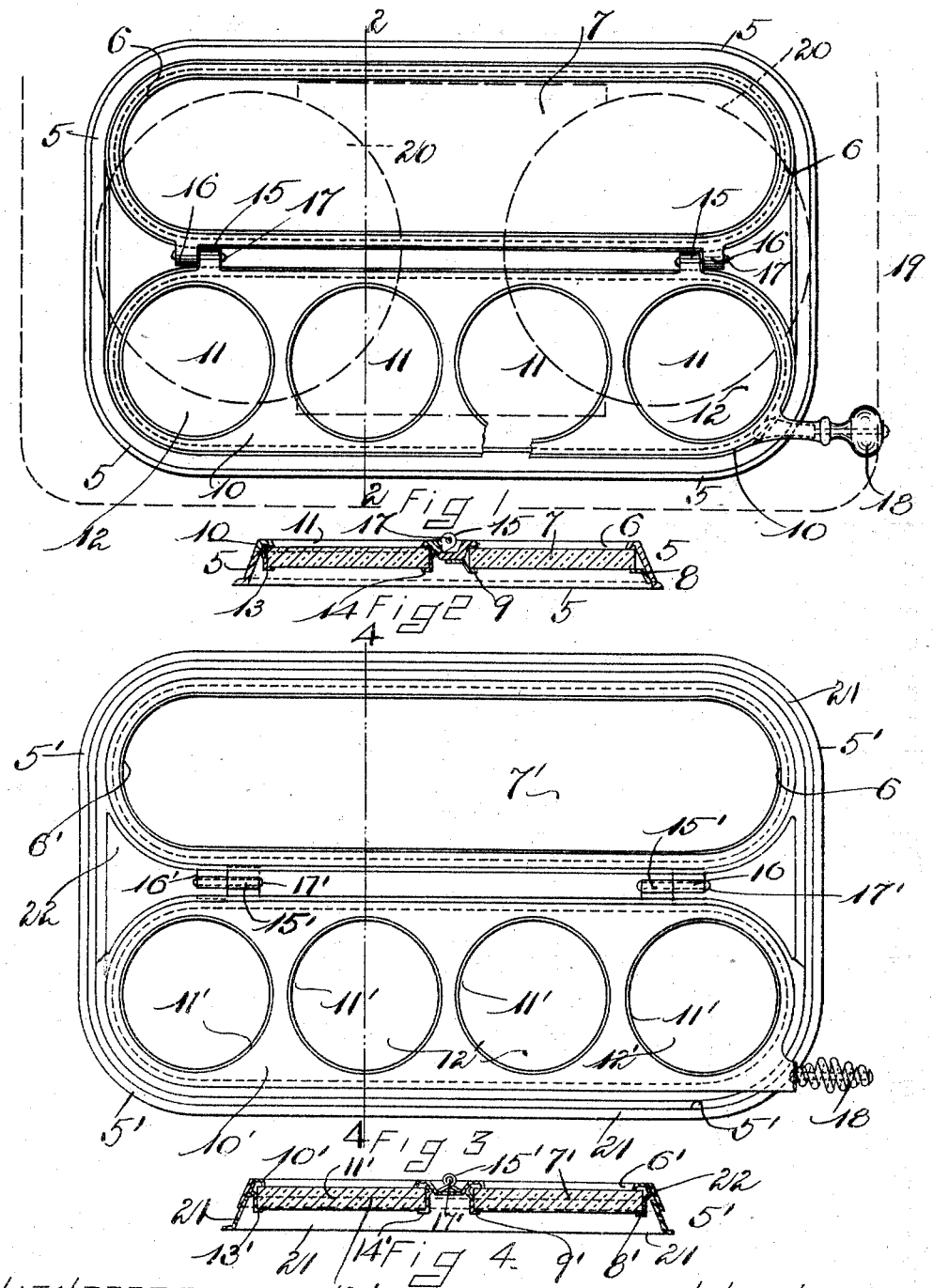

UNITED STATES PATENT OFFICE.

WILLIAM A. SAUNDERS, OF BOSTON, MASSACHUSETTS.

PANCAKE GRIDDLE AND TURNER.

SPECIFICATION forming part of Letters Patent No. 764,382, dated July 5, 1904.

Application filed August 6, 1903. Serial No. 168,466. (No model.)

*To all whom it may concern:*

Be it known that I, WILLIAM A. SAUNDERS, a citizen of the United States, residing at Boston, in the county of Suffolk and State of Massachusetts, have invented new and useful Improvements in Pancake Griddles and Turners, of which the following is a specification.

The object of this invention is to provide a strong, cheap, and durable griddle especially adapted for frying and turning pancakes.

The invention consists in the combination and arrangement of parts set forth in the following specification and particularly pointed out in the claims thereof.

Referring to the drawings, Figure 1 is a plan view, partly broken away, of a griddle constructed in accordance with my invention, illustrating the same in connection with a portion of the top of a stove, said stove being indicated in broken lines and the griddle being formed of castings. Fig. 2 is a transverse section taken on line 2 2 of Fig. 1 looking toward the left in said figure. Fig. 3 is a plan view of a griddle constructed in accordance with my invention and formed of sheet metal struck up by means of dies into the proper shape. Fig. 4 is a transverse section taken on line 4 4 of Fig. 3.

Like numerals refer to like parts throughout the several views of the drawings.

In the drawings, 5 is a stationary frame, preferably formed of castings and provided with an oblong recess 6 in its upper face, which extends entirely thereacross. Beneath the recess 6 is a soapstone plate 7, which is fastened to the stationary frame 5 by brackets 8 9. The soapstone plate 7 extends longitudinally of the recess 6 entirely thereacross. A rotatory frame 10 is provided with a series of recesses 11 11 11 11, and beneath said recesses, extending longitudinally of the rotatory frame 10, is a soapstone plate 12, which is fastened to the rotatory frame 10 by brackets 13 14. The rotatory frame 10 is provided with ears 15 15 and the stationary frame 5 with ears 16 16, said ears being pivotally connected by a pintle 17. A handle 18 is provided, by means of which the rotatory frame may be readily rocked upon its pivots 17.

In use the device is placed upon the top of a stove or range 19 above the front covers 20 20 and batter is poured into the recesses 11 11 upon the soapstone plate 12. When the cakes are sufficiently cooked upon one side, the rotatory frame 10 is tipped, by means of the handle 18, until in an inverted position, when the cakes fall out of the recesses 11 upon the soapstone plate 7 inside the recess 6 and when sufficiently cooked are removed in the usual manner. The soapstone plate affords an excellent surface for the purpose specified and is much less liable to burn the cakes than a griddle entirely composed of metal. It will be seen that as the cakes are turned from the rotary frame 10 onto the soapstone plate 7 inside the recess 6 they are prevented by said recess from slipping or sliding off the griddle and onto the top of the range or stove.

In Figs. 3 and 4 I have illustrated my improved griddle formed of sheet metal, in which the stationary frame 5' is formed in two parts—a lower part 21 and an upper part 22. The upper part 22 is provided with a recess 6', beneath which extends a soapstone plate 7', fastened to the upper part 22 by brackets 8' 9'. A rotatory frame 10' is provided with a series of recesses 11', beneath which recesses extends a soapstone plate 12', fast to the rotatory frame 10' by brackets 13' and 14'. The rotatory frame 10' is provided with ears 15', and the stationary frame 5' is provided with ears 16', said ears being pivoted one to the other by means of the pintles 17'. A handle 18' is provided, by means of which the rotatory frame 10' may be inverted, as hereinbefore described with relation to the form of my invention illustrated in Figs. 1 and 2.

The operation of the device illustrated in Figs. 3 and 4 is exactly the same as that of the device illustrated in Figs. 1 and 2.

The form of my invention illustrated in Figs. 3 and 4 is much cheaper to manufacture in large quantities on account of being stamped from sheet metal than the form illustrated in Figs. 1 and 2, which is made of castings, and the form illustrated in Figs. 3 and 4, moreover, possesses the advantage of being more susceptible to heat, because it is of less thickness than that illustrated in Figs. 1 and 2.

Having thus described my invention, what I claim, and desire by Letters Patent to secure, is—

1. In a device of the character described, a stationary frame provided with a recess in its upper face and a soapstone plate fast thereto beneath said recess; in combination with a rotary frame, pivoted to said stationary frame, said rotary frame provided with a recess, and a soapstone plate fast to said rotary frame beneath said recess.

2. A device of the character described comprising in its construction a stationary frame provided with a recess in its upper face and a soapstone plate fast thereto beneath said recess; in combination with a rotary frame pivoted to said stationary frame, said rotary frame provided with a series of recesses, and a soapstone plate fast thereto and extending longitudinally thereof beneath said recesses.

3. A device of the character described comprising in its construction a stationary frame formed of stamped sheet metal and consisting of an upper and a lower part, said upper part having a recess in its upper face, and a soapstone plate fast to said upper part beneath said recess; in combination with a rotary frame formed of stamped sheet metal provided with a series of recesses, and a soapstone plate fast to said rotary frame and extending longitudinally thereof beneath said recesses.

In testimony whereof I have hereunto set my hand in presence of two subscribing witnesses.

WILLIAM A. SAUNDERS.

Witnesses:
CHARLES S. GOODING,
ANNIE J. DAILEY.